（12）United States Patent
Suri

(10) Patent No.: US 7,280,486 B2
(45) Date of Patent: Oct. 9, 2007

(54) DETECTION OF FORWARDING PROBLEMS FOR EXTERNAL PREFIXES

(75) Inventor: Shyam Suri, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 272 days.

(21) Appl. No.: 10/752,735

(22) Filed: Jan. 7, 2004

(65) Prior Publication Data

US 2005/0147051 A1    Jul. 7, 2005

(51) Int. Cl.
H04L 12/26    (2006.01)
(52) U.S. Cl. .................. 370/248; 370/250; 370/428
(58) Field of Classification Search ............... 370/218, 370/244, 248, 250, 428
See application file for complete search history.

(56) References Cited

U.S. PATENT DOCUMENTS

| 6,335,927 | B1 | 1/2002 | Elliott et al. ............... 370/352 |
| 6,584,093 | B1 | 6/2003 | Salama et al. .............. 370/351 |
| 6,611,872 | B1 | 8/2003 | McCanne ................... 709/238 |
| 6,647,428 | B1 | 11/2003 | Bannai et al. .............. 709/245 |
| 2001/0044842 | A1* | 11/2001 | Kawakami .................. 709/223 |
| 2002/0150041 | A1* | 10/2002 | Reinshmidt et al. ........ 370/216 |
| 2003/0023701 | A1 | 1/2003 | Norman et al. ............. 709/214 |
| 2003/0142643 | A1* | 7/2003 | Yang et al. ................. 370/328 |
| 2003/0145105 | A1* | 7/2003 | Desineni et al. ........... 709/238 |
| 2003/0204619 | A1* | 10/2003 | Bays .......................... 709/238 |

* cited by examiner

Primary Examiner—Wing Chan
Assistant Examiner—Richard Chang
(74) Attorney, Agent, or Firm—Aka Chan LLP

(57) ABSTRACT

Methods and apparatus for enabling a provider to perform a tracing procedure to determine the existence forwarding problems within its network are disclosed. According to one aspect of the present invention, a method for detecting a forwarding problem within an autonomous system includes initiating a message from a source node. The message is sent to a message destination that is an external address relative to the autonomous system. The method also includes forwarding the message from the source node along a path to the external address which includes an intermediate node and a destination node. The message is received on the destination node through a first path segment of the path. Finally, the message is removed from the path at the destination node, and a response that indicates that the intermediate node does not have a forwarding problem is sent along the first path segment to the source node.

5 Claims, 9 Drawing Sheets

DETECTION OF FORWARDING PROBLEMS FOR EXTERNAL PREFIXES

BACKGROUND OF THE INVENTION

1. Field of Invention

The present invention relates generally to network systems. More particularly, the present invention relates to enabling a substantially internal trace process to be used to identify nodes within a provider network which are not able to forward external prefixes.

2. Description of the Related Art

The demand for data communication services is growing at an explosive rate. Much of the increased demand is due to the fact that more residential and business computer users are becoming connected to the Internet. Within a network, as for example an optical network, different provider networks, or autonomous systems, may be in communication with one another. For example, an overall network may include multiple autonomous systems which each include various nodes such as routers and servers. For a first customer to communicate with a second customer, the first customer generally initiates the transmission of a packet which may pass through one or more autonomous systems en route to the second customer. FIG. 1 is a diagrammatic representation of an overall network which includes a plurality of autonomous systems. A first autonomous system 102 or provider network may be in communication with a second autonomous system 106 and a third autonomous system 110. Typically, autonomous system 120 is a network associated with one provider while autonomous systems 106, 110 may be networks associated with other providers.

First autonomous system 102 includes edge nodes, e.g., routers or servers, 114 and core nodes, e.g., routers or servers, 118. Similarly, second autonomous system 106 includes edge nodes 124 and core nodes 128. As will be appreciated by those skilled in the art, a border gateway protocol (BGP) effectively enables first autonomous system 102 to learn about routes to second autonomous system 106. Edge routers 114 of first autonomous system 102 may be communicably coupled to edge routers in other autonomous systems. By way of example, edge router 114g may be in communication with edge router 124a of second autonomous system 106, while edge router 114e may be in communication with an edge router 134 of third autonomous system 110.

Edge router 114a is in communication with a customer edge 140 that wishes to access or communicate with a node 144. As shown, node 144 is not a part of either first autonomous system 102 or second autonomous system 106, although customer 140 may communicate with node 144 using routers 114, 118 included in autonomous system 102 and routers 124, 128 included in autonomous system 106.

When customer 140, or an overall source, wishes to communicate with node 144, or a destination address, customer 140 will forward a packet or a message which specifies a destination as node 144. The packet that is forwarded will pass through any number of domains, e.g., first autonomous system 102 and second autonomous system 106, en route to node 144. Prefixes associated with the packet which pertain to the destination address, as well as available routes, are generally advertised by autonomous systems 102, 106 to their customers such as customer 140 through a standard exterior routing protocol like a Border Gateway Protocol (BGP). When there are no failures within first autonomous system 102 or second autonomous system 106, then a packet forwarded to node 144 by customer 140 will successfully reach customer 140. However, when there is at least one failure at an intermediate point, i.e., a failure of a node 114, 118 within first autonomous system 102 or a failure of a node 124, 128 within second autonomous system 106, the packet may not successfully reach node 144. A failure of an intermediate point may be the result of an intermediate point being off line, or of forwarding entries not being properly setup at an intermediate point such that a packet or, in general, traffic passing through that intermediate point is effectively dropped.

Failures of intermediate points along a path between customer 140 and node 144 are considered to be silent failures, since an operator of an autonomous system such as first autonomous system 102 or second autonomous system 106 is generally not aware of a problem within his or her autonomous system unless one of the end users, i.e., either customer 140 or node 144, notices the problem. If customer 140 notices that a packet that was sent to node 144 was not acknowledged by node 144, customer 140 may send a ping towards node 144 which effectively causes nodes 114, 118 within first autonomous system 102 and nodes 124, 128 within second autonomous system 106 to be pinged. Until a ping is sent, an operator of first autonomous system 102 or second autonomous system 106 would not be aware of any potential failures within either first autonomous system 102 or second autonomous system 106, respectively.

FIG. 2a is a block diagram representation of a customer edge which forwards a message through a provider network to a destination address. A provider network 206, which generally includes at least one provider edge node and a provider core node, may advertise prefixes and routes to customer edge 202. When customer edge 202 wishes to communicate with a destination address 210, customer edge 200 may forward a message 220 through provider network 206 to destination address 210, as discussed above.

When a traffic drop occurs as a result of a silent failure within provider network 206, e.g., when forwarding entries within provider network 206 are not properly set up, a message that is sent from customer edge 200 and intended for destination address 210 may not reach destination address 210. As shown in FIG. 2b, when a message 224 fails to reach destination address 210 because of a failure within provider network 206, customer edge 202 may send a ping 250 through provider network 206 towards destination address 210. Ping 250 is generally arranged to enable a determination to be made that there is a failure associated with provider network 206, and to enable customer edge 202 to notify provider network 206 that there is a failure within provider network 206. Diagnostic processes may then be performed on provider network 206 to ascertain where within provider network 206 a failure has occurred.

FIG. 3 is a diagrammatic representation of an autonomous system in which a core node of a provider network has failed. When a customer edge 340 attempts to send a message 336 to a destination address 344 through provider network 302 which includes provider edge nodes 314 and core nodes 318, message 336 may be sent through a best path as determined by a best path algorithm. Message 336 passes through provider edge node 314a and core node 318c. However, since a failure is associated with core node 318d, message 336 may not be correctly forwarded by core node 318d, and is effectively dropped.

If customer edge 340 expects a response to message 336 and one is not received, customer edge 340 may send a ping to destination address 344 through provider network 302. The ping may enable a determination to be made that a failure has occurred with a node 314, 318 associated with provider network 302. Typically, a customer associated with customer edge 340 may inform a provider that provider network 302 has effectively caused the customer a loss in connectivity. Hence, once the provider is aware that there is a failed node 314, 318, procedures may be performed on provider network 302 to identify node 318*d* as failing to forward message 336 and steps may be taken to substantially remedy the failure of node 318*d*, as will be appreciated by those skilled in the art.

Although pings which are sent by customer edges, i.e., customer edge nodes, are useful in enabling node failures within a provider network to be identified, customer edges may not necessarily initiate pings to determine why a forwarded message may not have reached an intended destination address. As a result, a provider may not be aware of a failure within its network. A ping generally may not be sent by a node of a provider network to a destination within the provider network to determine if there is a failure within the provider network, as it is often quite difficult to collocate additional equipment at each point in the network to enable such a ping to be sent. As will be appreciated by those skilled in the art, for non-shared media connectivity through a core, a separate provisioned layer 2 path from the edge node to the core node is generally required. This again breaks the point of checking connectivity, starting right from the edge. Hence, a provider may not readily determine that an intermediate point within a provider network is not set up to properly forward entries and is potentially dropping traffic. Therefore, unless a customer initiates a ping and notifies a provider of a potential failure within the provider network, the provider is generally unaware that a failure may exist at one of the nodes within the provider network. If the provider is unaware of a failure, a failure may not be corrected, and customers which use the provider network may be dissatisfied with the performance of the provider network.

Therefore, what is desired is a method and an apparatus for enabling a provider to readily determine whether there is a failure of an intermediate point within a network or autonomous system associated with the provider. More specifically, what is needed is a system which enables a provider edge node to effectively initiate a ping-like message which allows it to be determined whether there is a failure within an autonomous system which includes the provider edge node.

SUMMARY OF THE INVENTION

The present invention relates to a system for enabling a provider to perform a tracing procedure to determine the existence forwarding problems associated with nodes within its network. According to one aspect of the present invention, a method for detecting a forwarding problem within an autonomous system includes initiating a message from a source node. The message is arranged to be sent to a message destination that is an external address which is not associated with the autonomous system. The method also includes forwarding the message from the source node along a path between the source node to the external address which includes an intermediate node and a destination node. The message is received on the destination node through a first path segment of the path. Finally, the message is removed from the path at the destination node, and a response that indicates that the intermediate node does not have a forwarding problem is sent along the first path segment from the destination node to the source node. In one embodiment, the message is a traceroute message.

The ability for a provider to run a tracing procedure within its own network to identify forwarding problems for external prefixes enables the provider to provide improved service to customers. For example, if a provider may run a tracing procedure, e.g., a provider may both effectively initiate pings and also receive the initiated pings within its network, without being prompted by a customer who notices a potential external prefix forwarding problem, the quality of service to customers is enhanced, as the likelihood that customers may experience traffic drops is effectively reduced. By initiating or sending a traceroute message from a source provider edge node which has a destination address specified as a Border Gateway Protocol (BGP) next hop, but effectively terminating the traceroute message at a destination provider edge node, a provider may effectively ping its own network to ascertain whether any forwarding failures occur along a particular path.

According to another aspect of the present invention, a method for detecting a forwarding problem within an autonomous system which has a source node, an intermediate node, and a destination node includes initiating a message from a source node, and forwarding the message from the source node along a path. The message is arranged to be sent to a message destination that is an external address that is not an address located within the autonomous system, and the path is arranged to pass from the source node to the external address via the intermediate node and the destination node. The message also includes determining whether a response to the message is received from the destination node, and initiating a process to identify a source of the forwarding problem when it is determined that the response to the message is not received from the destination node.

In one embodiment, initiating the process to identify the source of the forwarding problem includes sending a new message from the source node to the intermediate node along the path, the new message being of substantially the same type as the message. In another embodiment, the method also includes identifying the path, determining a number of nodes through which the path passes between the source node and the destination node, and storing an indication in the message that substantially identifies a number of nodes through which the path passes between the source node and the destination node.

According to another aspect of the present invention, a method for detecting a forwarding problem within an autonomous system includes receiving a message on a destination node from a source node. The message substantially originates at the source node and is intended to be sent through the destination node to a message destination that is an external address which is not an address located within the autonomous system. The message is received on the destination node through a path segment between the source node and the destination node that is a part of an overall path between the source node and the message destination. The method also includes removing the message from the overall path at the destination node to substantially prevents the message from reaching the message destination, and initiating a response from the destination node that is sent along the path segment from the destination node to the source node to indicate that an intermediate node which is along the path segment does not have a forwarding problem.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

A network provider is generally unable to determine if there are failures in intermediate points or nodes of its network which prevent messages from being properly forwarded unless a customer who uses the network notifies the network provider of a potential failure within the network. The inability for a network provider to determine on its own that message forwarding may not be properly set up on at least one node of its network is inefficient, since if no customer notifies the network provider of a potential failure, a failed node may remain substantially undetected for a relatively long period of time. When a network provider does not know about a failed node, the network provider may not take steps to rectify the situation. In addition, customers who are unable to successfully send or receive messages through the provider network may be inconvenienced when their messages are lost.

The ability for a provider to determine whether an autonomous system or network owned by the provider has forwarding problems for external prefixes would enable the provider to correct the forwarding problems without waiting for customer notification of forwarding problems. If a provider is able to troubleshoot its network for forwarding failures substantially without being prompted by a customer of the network, the provider is better able to maintain its network, and customers of the network are less likely to be inconvenienced by traffic drops within the network.

By enabling a provider edge node of a network to forward a message along a path to another provider edge node associated with the same network, a provider is able to ascertain whether there are any forwarding problems along the path. In one embodiment, a best path from a source provider edge node to a Border Gateway Protocol (BGP) next hop may be identified, and an echo message or a new Internet Control Message Protocol (ICMP) message may effectively be sent from the source provider edge node along the best path to the BGP next hop. If the message reaches the provider edge node which would typically forward the message to the BGP next hop, i.e., forward the message out of the provider network, that provider edge node may remove the message from the path, and send a return message to the source provider edge node which indicates that there are no forwarding problems within the network. A provider may periodically send echo messages or new ICMP messages from each provider edge node to determine if forwarding of external prefixes is properly set up on each intermediate hop within the network. When forwarding problems are detected, the provider may effectively debug the network to identify the source or sources of the forwarding problems, and correct the forwarding problems. As a result, the ability for a provider to determine if there are forwarding problems within its network may reduce the likelihood that a customer encounters problems when sending traffic through the network to a BGP next hop.

Figure 1:
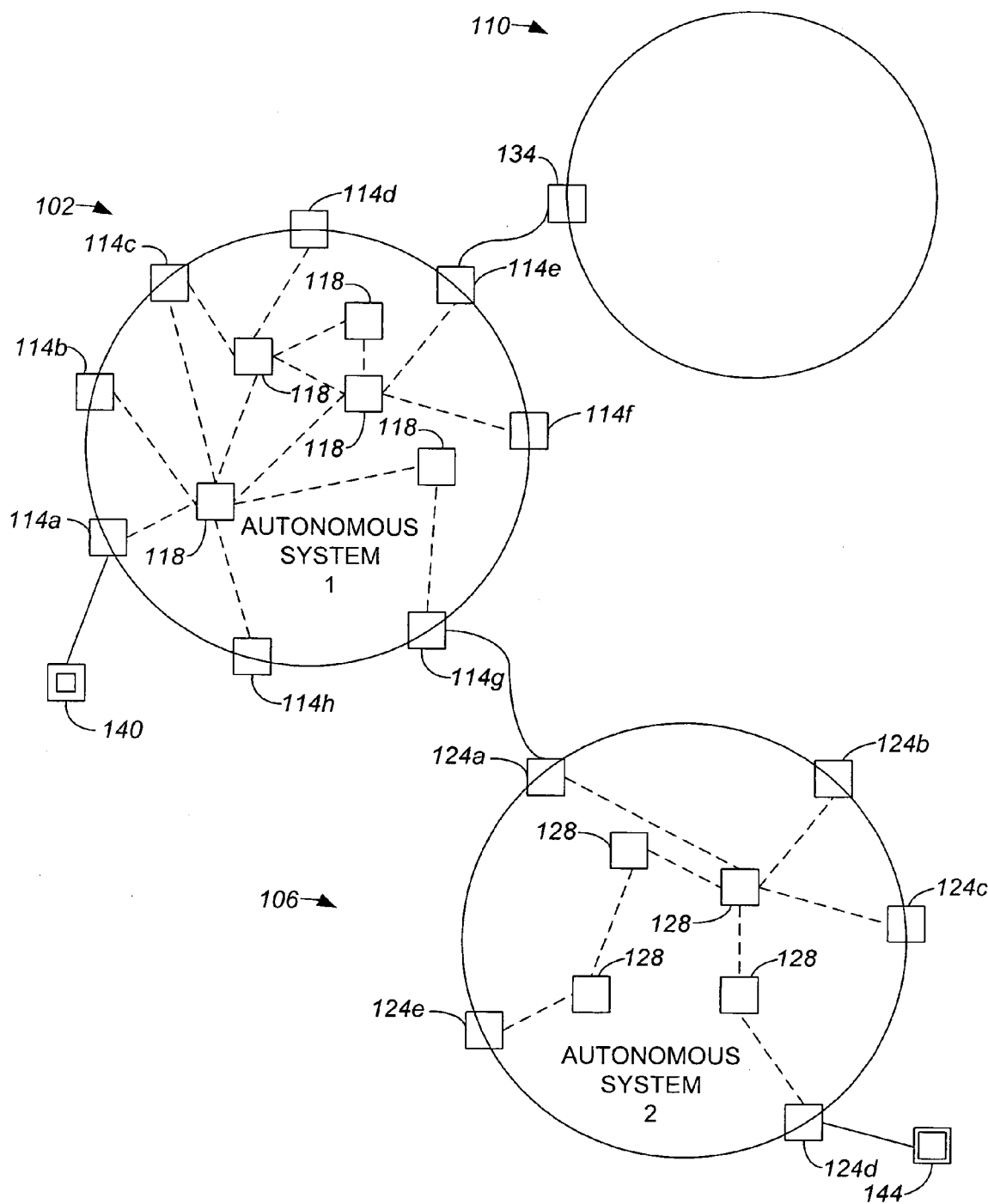
FIG. 1 is a diagrammatic representation of an overall network which includes a plurality of autonomous systems.
Figure 2A:
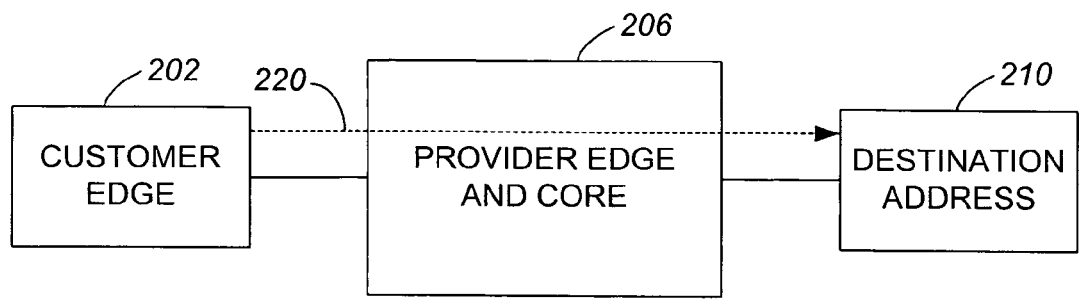
FIG. 2a is a block diagram representation of a customer edge which forwards a message through a provider network to a destination address.
Figure 2B:
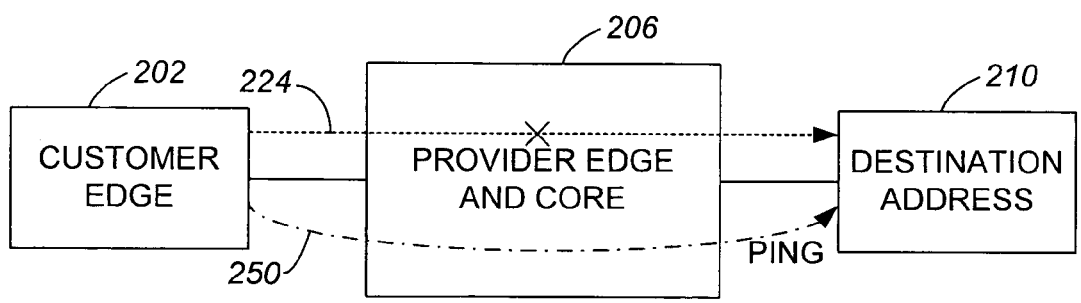
FIG. 2b is a block diagram representation of a customer edge which fails to forward a message through a provider network to a destination address.
Figure 3:
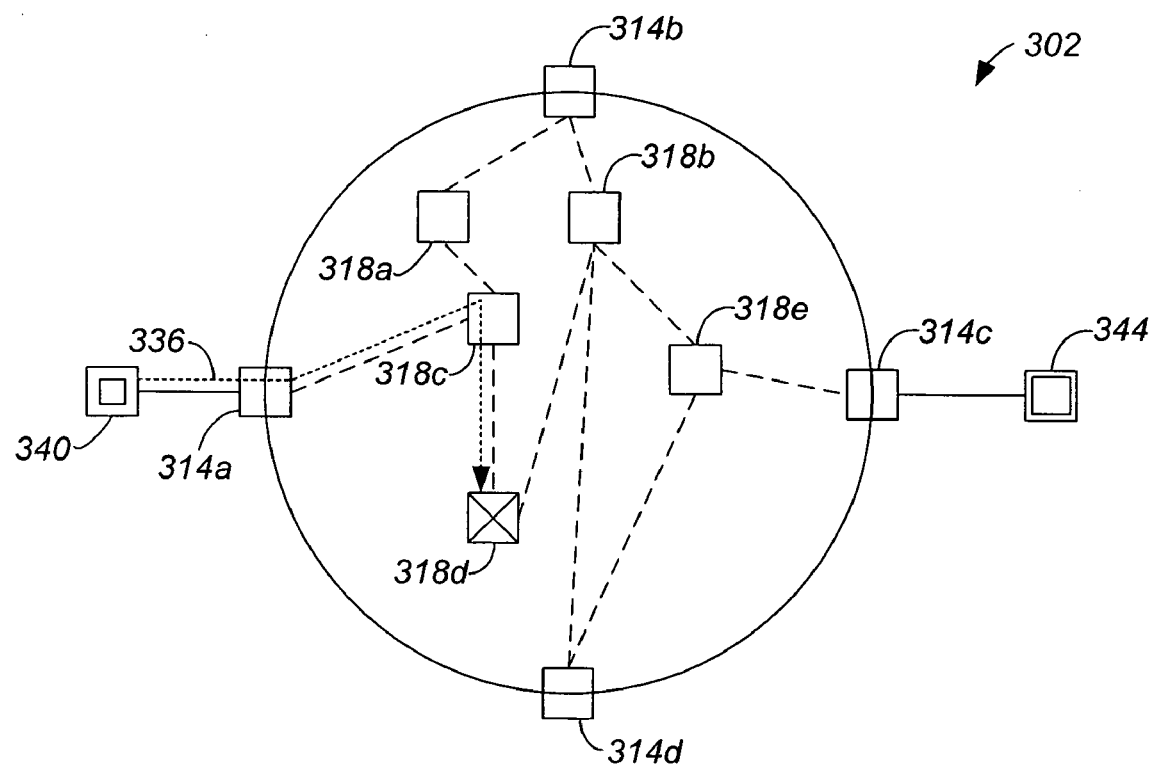
FIG. 3 is a diagrammatic representation of an autonomous system in which a core node of a provider network has failed.
Figure 4:
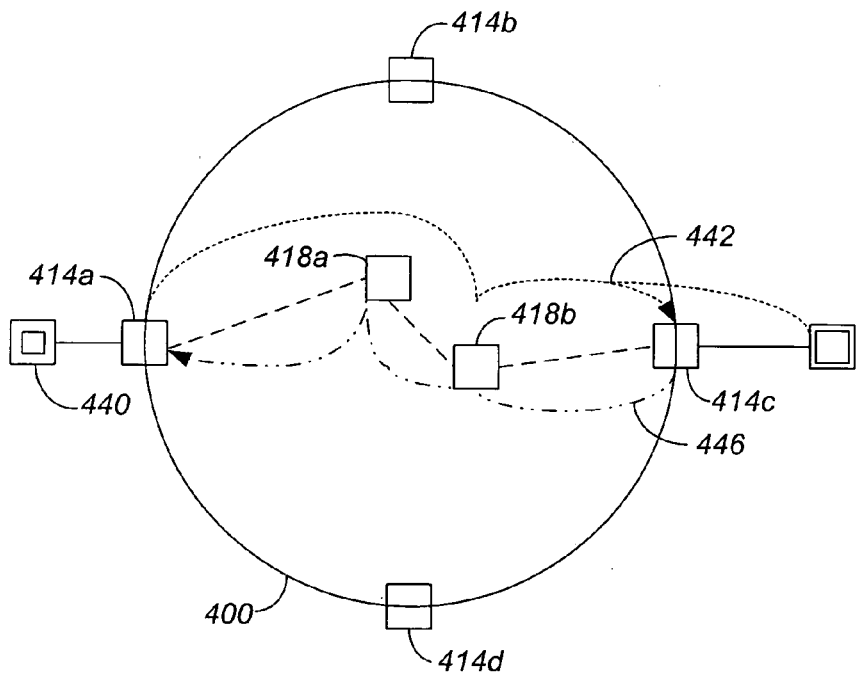
FIG. 4 is a diagrammatic representation of an autonomous system within which a traceroute message such as an echo message or a new Internet Control Message Protocol (ICMP) message may be sent to determine the existence of a forwarding problem in accordance with an embodiment of the present invention.

FIG. 4 is a diagrammatic representation of an autonomous system within which an echo or new ICMP message may be sent to determine the existence of a forwarding problem in accordance with an embodiment of the present invention. An autonomous system 400 has edge nodes 414 and core nodes 418. In general, edge nodes 414 and core nodes 418 may be considered to be hops associated with system 400. Further, edge nodes 414 and core nodes 418 may be devices including, but not limited to, routers and servers.

If a customer 440 is to send data to an external prefix or destination address 444, the customer 440 uses system 400. In the embodiment as shown, a best path from customer 440 to destination address 444 may include a source provider edge node 414a, core nodes 418a and 418b, and a destination provider edge node 414c. Generally, a best path may be a least cost path or a path with the most available bandwidth, as determined by an algorithm such as a best path algorithm. To ascertain whether there are any potential forwarding problems along the path between source provider edge node 414a and destination provider edge node 414c, source provider edge node 414 may effectively send a traceroute message 442 through core node 418a and core node 418b to destination provider edge node 414c. If destination provider edge node 414c receives traceroute message 442, destination provider edge node 414c returns a response 446 back to source provider edge node 414a through core node 418b and core node 418*a*. If response 446 is sent by destination provider edge node 414*c* and received by source provider edge node 414*a*, then the indication is that core nodes 418*a* and 418*b*, e.g., intermediate hops, are set up to properly forward external prefixes.

Traceroute message 442 may generally be an echo message or may be a new ICMP message that is arranged to be used to verify that the forwarding of external prefixes is properly configured within system 400. One example of a new ICMP message will be discussed below with respect to FIG. 9. Traceroute message 442 effectively serves as a ping message that is initiated within system 400, i.e., by source provider edge node 414*a*, and is effectively terminated within system 400, i.e., at destination provider edge node 414*c*. However, in specifying a destination in traceroute message 442, destination address 444 may be specified such that traceroute message 442 is sent along a path between source provider edge node 414*a* that includes destination provider edge node 414*c*. Once destination provider edge node 414*c* receives traceroute message 442, destination provider edge node 414*c* may substantially remove traceroute message 442 from its forwarding path, thereby preventing traceroute message 442 from being sent to destination address 444.

Figure 5:
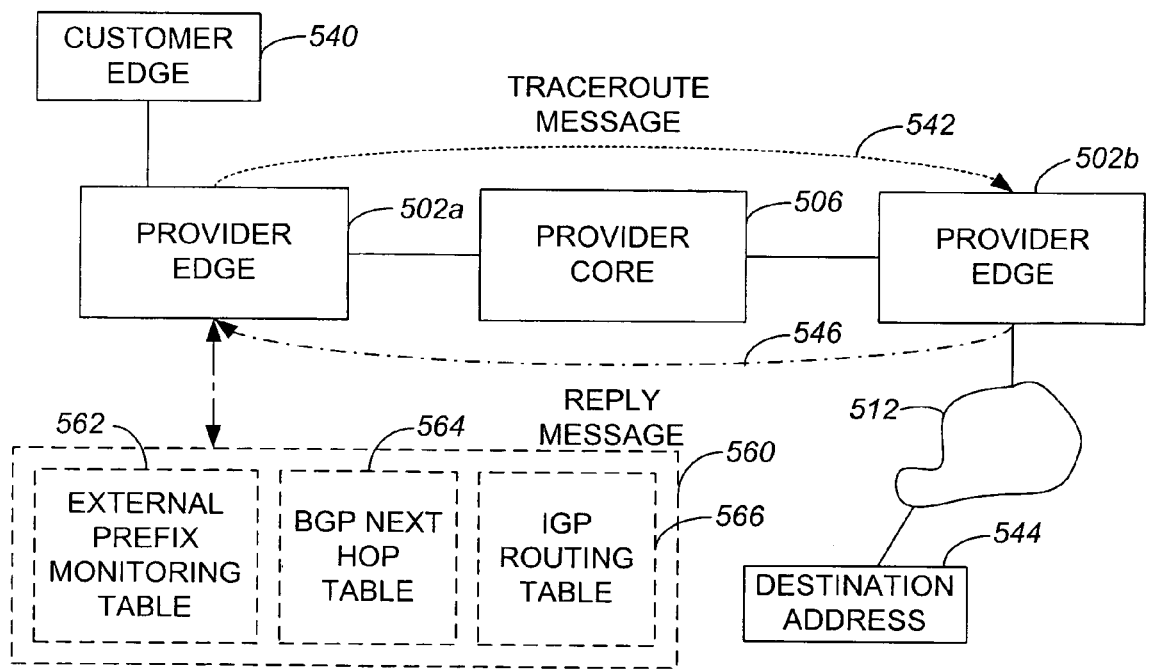
FIG. 5 is a diagrammatic block representation of a system which uses traceroute messages in accordance with an embodiment of the present invention.

Traceroute message 442 generally includes information pertaining to destination address 444, as well as information that effectively enables destination provider edge node 414*c* to be identified. FIG. 5 is a diagrammatic block representation of a system which uses traceroute messages in accordance with an embodiment of the present invention. A traceroute message 542 may be initiated by a source provider edge 502*a* and effectively terminated by a destination provider edge 502*b*. Traceroute message 542 may pass through a provider core 506 en route to provider edge 502*b*. Provider edge 502*b* may be identified as a suitable destination for traceroute message 542 if provider edge 502*b* is an exit point of a provider network and provider edge 502*a* is an entry point of the provider network that is associated with a best path (not shown) from a customer edge 540 to an external prefix or destination address 544.

Traceroute message 542 is generally sent to determine whether a path includes any intermediate hops which might have forwarding problems. By way of example, provider edge 502*a* may select a path on which traceroute message 542 is to be sent in order to ensure that when customer edge 540 wishes to communicate with an external prefix 544 using the path, a packet sent by customer edge 540 will not be dropped by an intermediate hop between provider edge 502*a* and provider edge 502*b*.

In order to identify provider edge 502*b* as a destination provider edge for traceroute message 542, provider edge 502*a* may use a BGP next hop table 564 to identify a next hop, e.g., an edge node associated with a different network. As will be understood by those skilled in the art, BGP may install a best path for external routes in a routing information base (RIB) and select exit points for the external routes by subjecting the external routes to a best path calculation algorithm. BGP next hop table 564 may contain information pertaining to external prefixes and the corresponding next hops to be used in order to reach the external prefixes. That is, BGP next hop table 564 may contain next hops, as for example a next hop that is included in a network 512, through which a best path passes through in order to reach a particular destination address, as for example destination address 544.

An Interior Gateway Protocol (IGP) routing table 566 may contain information that pertains to the best path to use to get to a next hop identified using BGP next hop table 564. IGP routing table 566 may be used by provider edge 502*a* to provide reachability or routing to a next hop identified using BGP next hop table 564. The next-hop identified by the BGP is an exit point. By way of example, BGP next hop table 564 may be used to identify provider edge 502*b* as an exit point of a path which includes provider edge 502*a* and provider core 506 and allows network 512 and, hence, destination address 544 to ultimately be reached. In one embodiment, provider edge 502*a* may also access an external prefix-monitoring table 562 which may be used to determine of a particular external prefix or destination address is to be monitored. External prefix monitoring table 562 may include information such as external prefixes, pointers to appropriate entries in BGP next hop table 564, connectivity states for the external prefixes, and timestamps associated with the external prefixes.

Provider edge 502*a* stores next hop information in traceroute message 542 such that when traceroute message 542 is sent, traceroute message 542 is effectively sent along a path which would enable traceroute message 542 to be forwarded to the next hop. Using IGP routing table 566, provider edge 502*a* may determine how many internal hops within the provider network which includes provider edges 502 it takes for provider edge 502*b* to be reached. Once provider edge 502*a* determines how many hops there are along a best path between provider edge 502*a* and provider edge 502*b* which would allow customer edge 540 to efficiently communicate with destination address 544, provider edge 502*a* may store an indicator in traceroute message 542 which identifies a number of hops remaining to reach provider edge 502*b*, i.e., the exit point. The indicator may be a counter which is decremented by provider core 506 when provider core 506 receives traceroute message 542 from provider edge 502*a* and forwards traceroute message 542 to provider edge 502*b*. When provider edge 502*b* receives traceroute message 542, provider edge 502*b* may effectively read the indicator and determine that it is the intended destination of traceroute message 542, and therefore remove traceroute message 542 from its forwarding path. In one embodiment, the indicator may include time to live (TTL) expiry information such as a TTL value that may be obtained from BGP next hop table 560.

If traceroute message 542 is received by provider edge 502*b*, then forwarding is properly set up along the path between provider edge 502*a* and provider edge 502*b*. As such, provider edge 502*b* may send a reply message 546 to provider edge 502*a* along the path between provider edge 502*a* and provider edge 502*b*. Reply message 546 serves to notify provider edge 502*a* that there are no forwarding problems along the path on which traceroute message 542 was sent.

Figure 6:
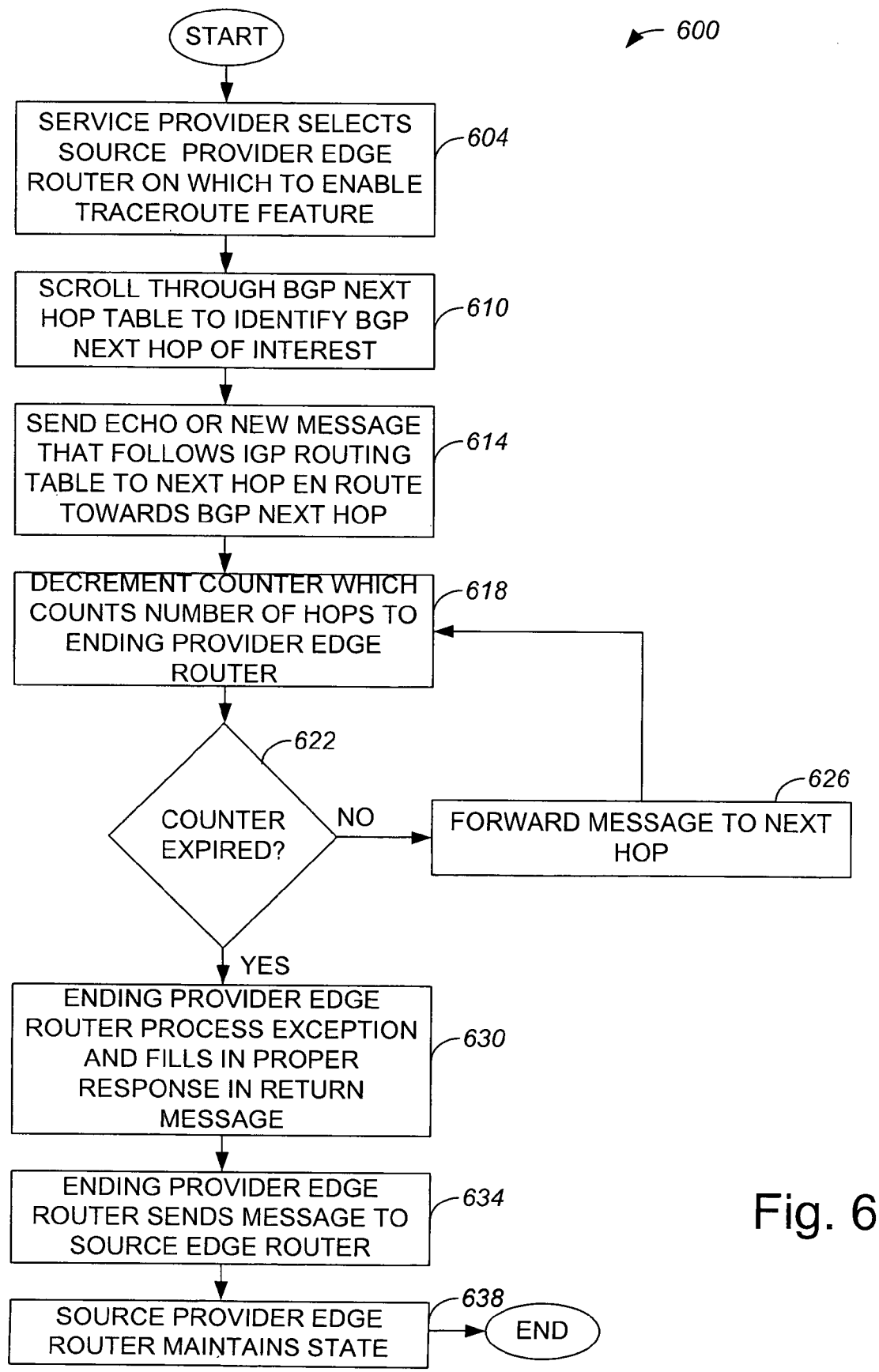
FIG. 6 is a process flow diagram which illustrates one method of testing a path between a source provider edge router and an ending provider edge router, e.g., an exit point, when no internal failures are present on the path in accordance with an embodiment of the present invention.

Traceroute message 542, which may take the form of an echo message or the form of substantially any suitable ICMP message, is used to essentially test a path between provider edge 502*a* and provider edge 502*b* to identify any forwarding problems. Provider edges 502, which are often routers, are on the edges of a provider network which is used by a customer to communicate with a destination address that is an external prefix relative to the provider network. FIG. 6 is a process flow diagram which illustrates the steps associated with testing a path between a source provider edge router and an ending provider edge router, e.g., an exit point, when no internal failures are present on the path in accordance with an embodiment of the present invention. A process 600 of testing a path begins at step 604 in which a service provider selects a source provider edge router on which a traceroute feature is enabled. In one embodiment, various prefixes and a rate at which monitoring is done may also be selected. Once the source provider edge router is selected, a BGP next hop table is effectively scrolled through to identify a BGP next hop of interest in step 610. That is, a BGP next hop that is accessible from source provider edge router is selected.

Figure 9:
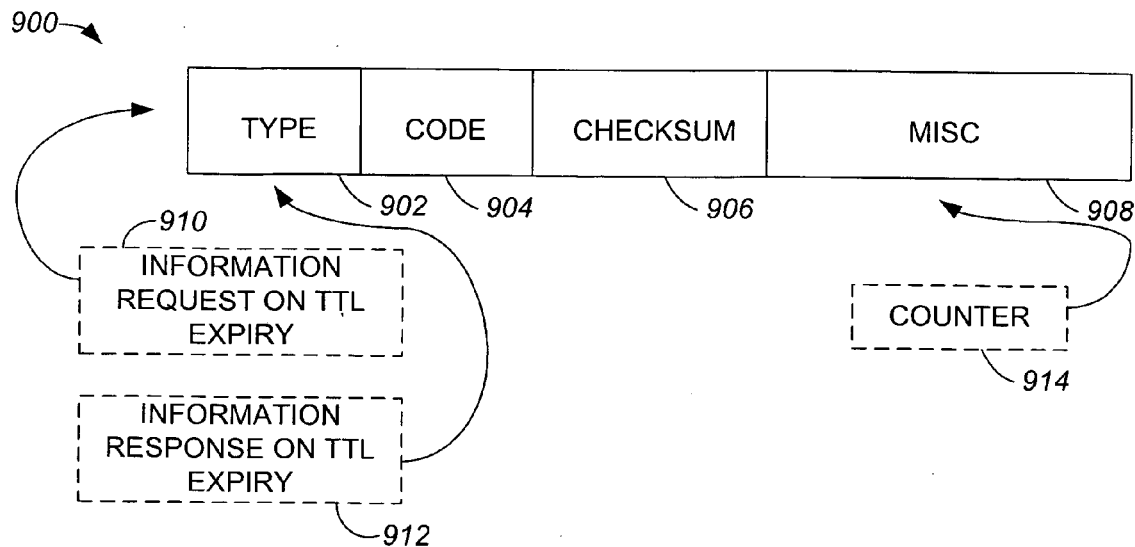
FIG. 9 is a diagrammatic representation of one new ICMP message which is a traceroute message suitable for use in ascertaining whether there is at least one failure of a node within a provider network in accordance with an embodiment of the present invention.

In step 614, an echo message or a new ICMP message, as for example a new ICMP message as described below with respect to FIG. 9, that follows an IGP routing table is forwarded to the next hop or node in the path between the source provider edge router and the BGP next hop. The echo message or the new message may be considered to be a traceroute message, and may include a counter, which is indicative of a TTL setting, that is arranged to indicate a number of hops remaining before the ending provider edge router or the exit point in the path is reached.

After the echo or new message is sent to the next hop in the path, the counter which effectively counts the number of hops between the current node and the ending provider edge router or the exit point is decremented in step 618. A determination is made in step 622 as to whether the counter has expired, e.g., whether the counter has a value of approximately zero. If it is determined in step 622 that the counter has not expired, then the echo or new message is forwarded to the next hop in the path in step 626. Once the echo or new message is forwarded to the next hop, process flow returns to step 618 in which the counter which counts the number of hops to the ending provider edge router is decremented.

Alternatively, if it is determined in step 622 that the counter has expired, then the implication is that the echo or new message has reached the ending provider edge router. Accordingly, the ending provider edge router removes the echo or new message from the forwarding path, i.e., substantially prevents the echo or new message from being forwarded out of the provider network, and processes the echo or new message as an exception in step 630. Processing the echo or new message as an exception may include filling in a proper response in a return message from the ending provider edge router to the source provider edge router. In step 634, the ending provider edge router sends the return message to the source provider edge router. Once the source provider edge router receives the return message, the source provider edge router maintains a state which indicates that the portion of the path from the source provider edge router to the BGP next hop identified in step 610 that is present in the provider network is operable. After the source provider edge router maintains the state which indicates that the path through the provider network between the source provider edge router and the ending provider edge router in the path to the BGP next hop identified in step 610 is operable, the process of testing a path is completed.

Figure 7:
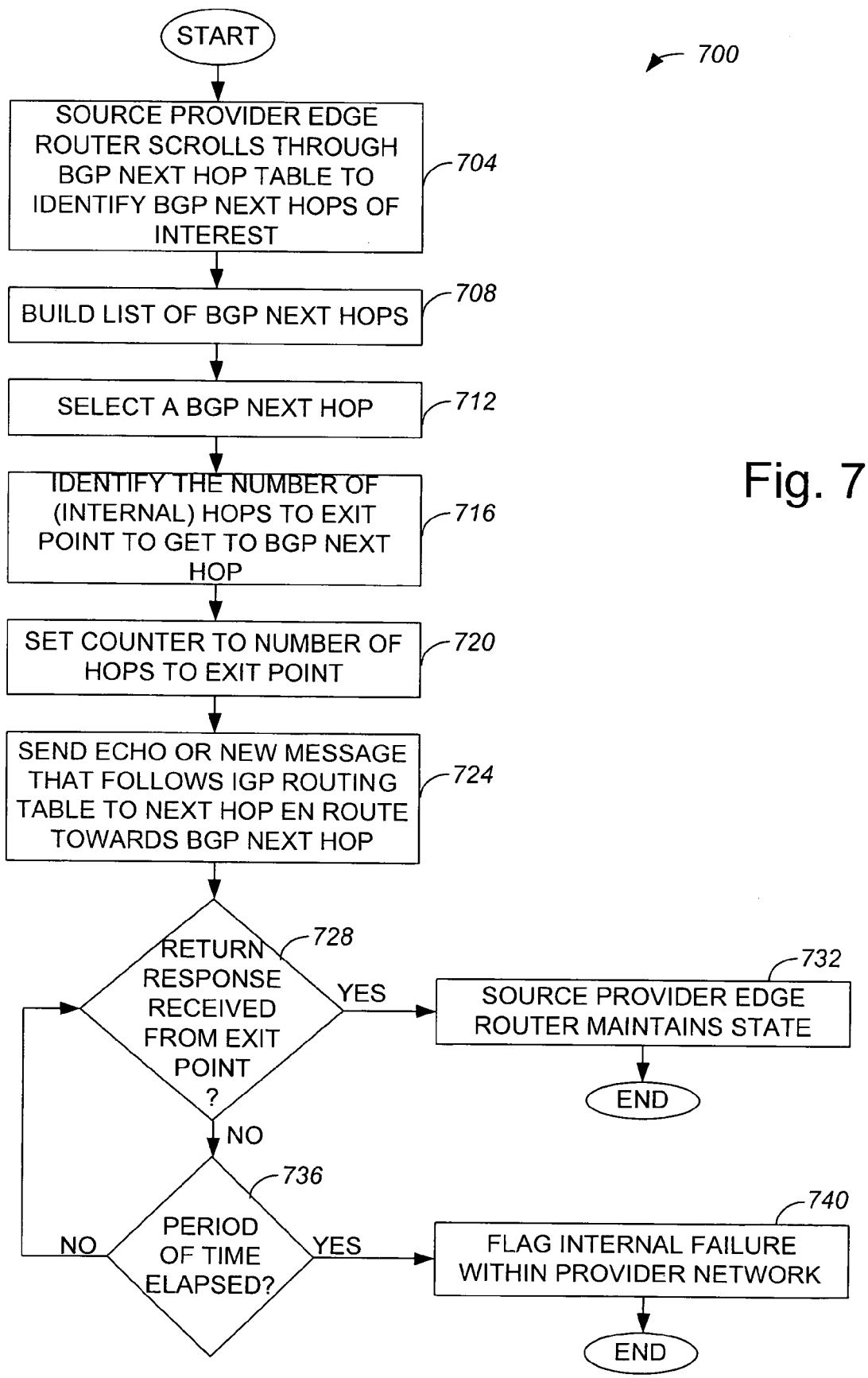
FIG. 7 is a process flow diagram which illustrates one method of determining whether there is a node within a provider network which has failed from the point-of-view of a provider edge node in accordance with an embodiment of the present invention.

During an overall testing process, a source provider edge router which serves as a source from which a message is sent to detect forwarding problems for external prefixes may perform various steps in determining whether a failure of a node has been detected. With reference to FIG. 7, one method of determining whether there is a node within a provider network which has failed from the point-of-view of a provider edge node will be described in accordance with an embodiment of the present invention. A process 700 of determining whether any nodes within a provider network begins at step 704 in which a source provider edge node, i.e., the provider edge router which is to be used to assess whether there is a provider node failure along one of its paths, scrolls through a BGP next hop table to identify BGP next hops of interest. That is, substantially every edge node or router of an autonomous system that may be substantially directly reached from the source provider edge router is identified using a BGP next hop table.

Once BGP next hop of interest are identified, a list of the BGP next hops of interest is effectively built in step 708. Then, in step 712, a BGP next hop is selected, i.e., as a destination for an echo or other message that will subsequently be sent from the source provider edge router. The number of hops within the provider network between the source provider edge router and the exit point, or the destination provider edge router, associated with the best path between the source provider edge router and the selected BGP next hop is identified in step 716. In one embodiment, such an identification may be made using an IGP routing table.

After the number of hops between the source provider edge router and the exit point is identified, a counter is set to substantially equal the number of hops in step 720. Then, in step 724, an echo message or a new ICMP message is sent from the source provider edge router to the next hop within the provider network en route to the BGP next hop. The echo message or the new message, which is described below with respect to FIG. 9, follows a route specified in the IGP routing table towards the BGP next hop selected in step 712.

A response message from the exit point is expected by the source provider edge router in the event that none of the nodes or hops along the path to the BGP next hop selected in step 712 has failed or is otherwise not able to forward messages. As such, a determination is made in step 728 as to whether a return response has been received from the exit point. If it is determined that a return response has been received from the exit point, the indication is that there are no failures associated with nodes or routers in the provider network along the path between the source provider node and the BGP next hop. Accordingly, the source provider edge router maintains a current state in step 732 to indicate that messages may be successfully forwarded along the path between the source provider edge router and the exit point, and the process of determining whether any nodes in the provider network have failed is completed.

Alternatively, if it is determined in step 728 that no return response has been received from the exit point, then a determination is made in step 736 regarding whether a predetermined period of time has elapsed. In other words, it is determined in step 736 whether a response should already have been received from the exit point if a response is forthcoming. When it is determined that a predetermined period of time has not elapsed, the implication is that a response may still be received from the exit point. Hence, process flow returns to step 728 in which it is determined if a return response has been received from the exit point.

On the other hand, if it is determined in step 736 that the predetermined period of time has elapsed, then the source provider edge router flags an internal failure within the provider network in step 740. It should be appreciated that flagging an internal failure generally serves to enable a network administrator, for example, to ascertain that one of the nodes in the path between the source provider edge router and the exit point has failed. The network administrator may initiate a process to effectively pinpoint the node or nodes which have failed. In one embodiment, in addition to flagging an internal failure, the source provider edge router may perform a debugging procedure to identify a failure along the path, as will be described below with reference to FIG. 10. Once an internal failure is flagged, the process of determining whether any nodes in a provider network have failed is completed.

Figure 8:
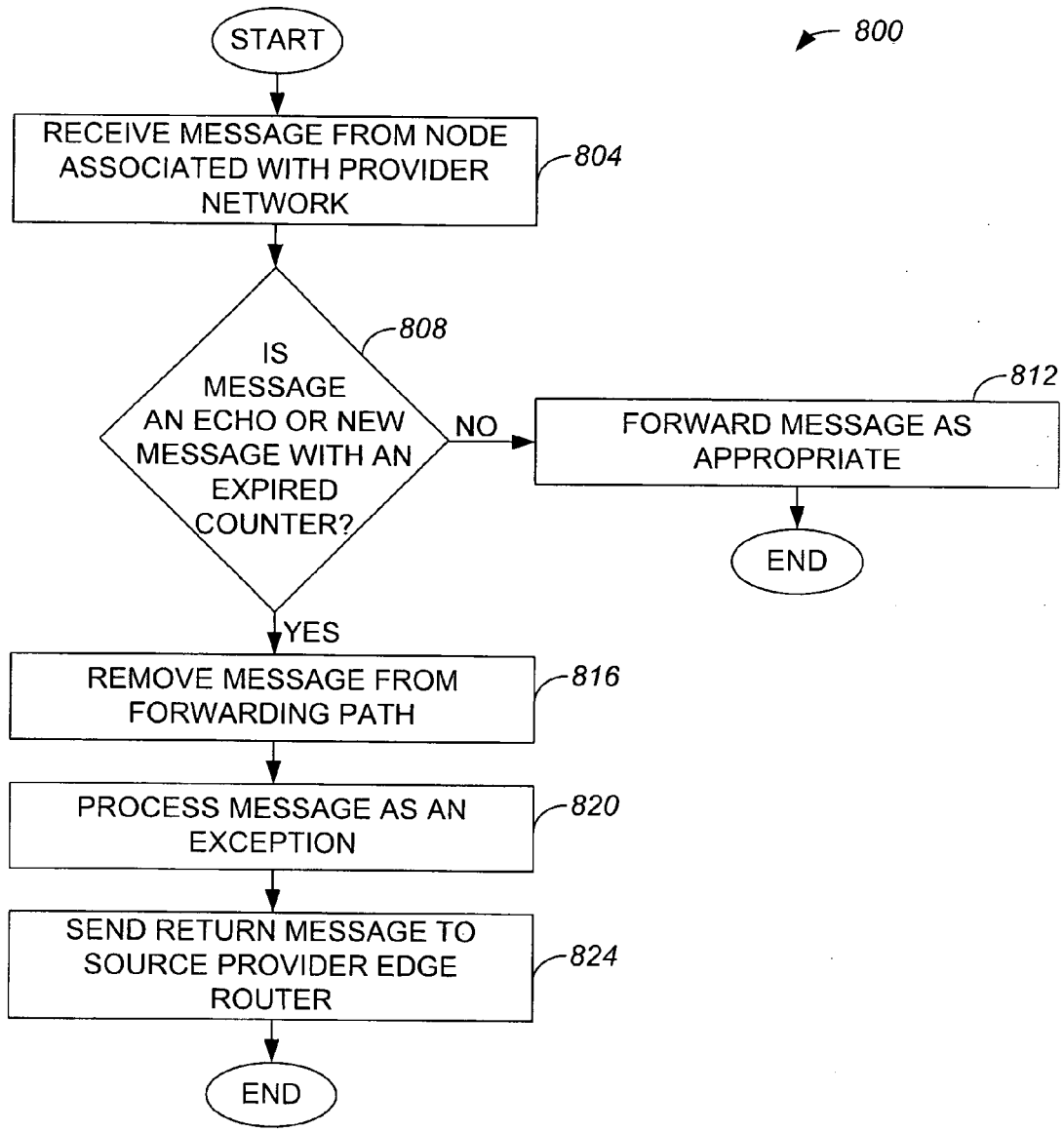
FIG. 8 is a process flow diagram which illustrates one method of processing a received message from the point-of-view of an exit point in accordance with an embodiment of the present invention.

A message used to detecting forwarding problems or failures of nodes within a provider network is generally forwarded through the provider network until it is received at an exit point or ending provider edge router, as previously mentioned. Once such a message is received by the exit point, it is processed by the exit point. FIG. 8 is a process flow diagram which illustrates one method of processing a received message from the point-of-view of an exit point in accordance with an embodiment of the present invention. A process 800 of processing a received message begins at step 804 in which an exit point receives a message from a node associated with a provider network, i.e., the provider network which includes both the exit point and the node which is typically a core node. Once the message is received, it is determined if the receive message is an echo message or a new ICMP message, and if the message has an expired counter in step 808.

If it is determined in step 808 that the message is not an echo message or a new message, the indication is that the message is not arranged to be used for detecting forwarding problems within the provider network. As such, the message is forwarded as appropriate in step 812. By way of example, the exit point may forward the message to a next hop, or to an edge router of another provider network. After the message is forwarded, the process of processing a received message is completed.

Alternatively, if the determination in step 808 is that the received message is either an echo message or a new message and that the counter is expired, then the message is removed from its forwarding path in step 816. Since the counter is expired, the exit point is the effective intended destination of the message, as the counter may be considered to be a TTL setting that is substantially set to expire at the exit point. Hence, the message may be removed from the forwarding path as it has reached its effective intended destination.

Once the message is removed from its forwarding path, the message is processed as an exception in step 820. In processing the message as an exception, a return message may be sent by the exit point to the source provider edge router along the path through which the message was originally sent. Then, in step 824, a return message is forwarded to the source provider edge router, and the process of processing a received message is completed.

The format of an echo message or a new ICMP message, e.g., a traceroute message such as traceroute message 542 of FIG. 5, which may be sent by a source provider edge node in order to determine if there are any nodal failures within a provider network may vary widely. FIG. 9 is a diagrammatic representation of one new ICMP message which is suitable for use in ascertaining whether there is at least one failure of a node within a provider network in accordance with an embodiment of the present invention. A message 900 may include any number of bits which are substantially divided into fields. A first field 902 may be a type field, e.g., of approximately four bits, that is used to specify a type associated with message 900. In the described embodiment, when field 902 is of "Type 17," the indication is that message 900 is an information request on a TTL expiry 910 that is sent to an external address, and when field 903 is of "Type 18," the indication is that message 900 is an information response on a TTL expiry 912. A code field 904, which may include approximately four bits, and a checksum field 906, which may include approximately seven bits, contain information requests that an exit point may effectively reply to.

A miscellaneous field 908 may include multiple bits which are arranged to hold substantially any information, as for example information used to verify tables, as well as a counter 914 which is used by an ending or destination provider edge node to determine whether message 900 is effectively intended for the ending provider edge node. Miscellaneous field 908 may also be arranged to contain a BGP next hop address to which message 900 is sent, i.e., sent such that message 900 may effectively be removed from a forwarding path by an ending provider edge node in order to substantially verify that a path between a source provider edge node and the ending provider edge node has no message forwarding problems.

Figure 10:
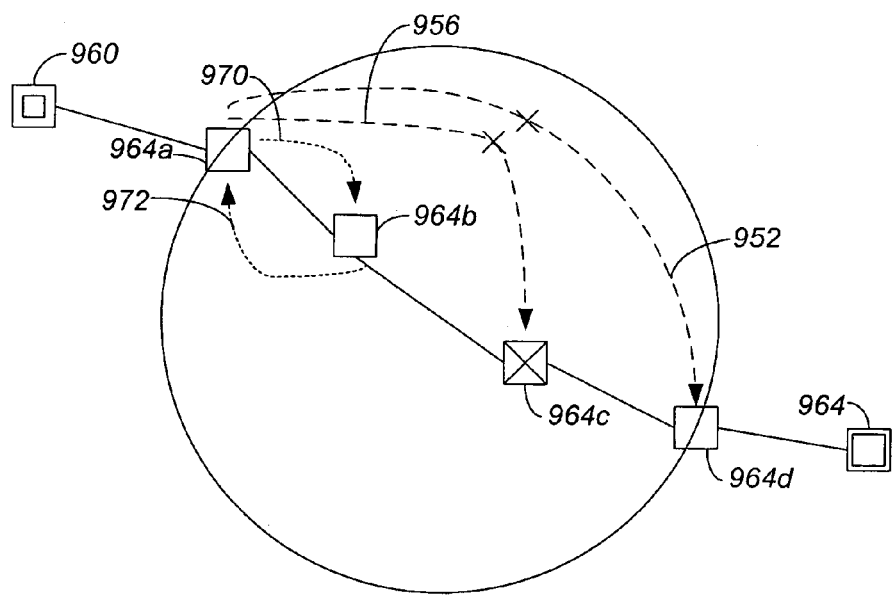
FIG. 10 is a diagrammatic representation of a system which uses traceroute messages to substantially identify a source of a forwarding problem in accordance with an embodiment of the present invention.

In addition to being used to ascertain whether any hops along a path have a forwarding problem, traceroute messages may also be used to identify the source of a forwarding problem along the path. With reference to FIG. 10, the use of traceroute messages to identify a source of a forwarding problem will be described in accordance with an embodiment of the present invention. A provider edge node 964a is the source of a path segment which passes through autonomous system or network 950 to provider edge node 964d which serves as an exit point. The path segment between provider edge nodes 964a and 964d may be a part of a best path between a customer edge 960 and a destination address 964.

When a traceroute message 950 that is effectively intended for provider edge node 964d does not reach provider edge node 964d, the indication is that at least one of intermediate core nodes 964b, 964c is not set up to properly forward messages along the path segment between provider edge 964a and provider edge 964d. Hence, when provider edge node 964a does not receive a reply message from provider edge node 964d, provider edge node 964a may generally assume that there is a forwarding failure associated with either or both core node 964b and core node 964c.

When provider edge node 964a wishes to identify a failed core node 964a, 964b, provider edge node 964a may send a traceroute message 956 which is arranged to effectively be received by core node 964c and removed from its forwarding path by core node 964c. In the described embodiment, a counter stored in traceroute message 956 which is typically arranged to identify the number of internal hops between provider edge node 964a and provider edge node 964d may be changed to identify the number of internal hops between provider edge node 964a and core node 964c. If core node 964c receives traceroute message 956, then core node 964b may be assumed not to have a forwarding failure. Accordingly, the indication is that the forwarding failure is with substantially only core node 964c, as shown. However, in another embodiment, if core node 964c fails to receive traceroute message 956, then since there is only one other core node 964b between provider edge node 964a and core node 964c, it may effectively be assumed that there is a forwarding failure with core node 964b.

Alternatively, in lieu of sending traceroute message 956 to core node 964c in order to substantially identify a source of a forwarding failure, a traceroute message 970 may be sent from provider edge node 964a that is to effectively be removed from its forwarding path by core node 964b, or the first core node along the path segment between provider edge node 964a and provider edge node 964b. When core node 964b successfully receives traceroute message 956 and sends a reply message 972 to provider edge node 964a, provider edge node 964a may assume that the forwarding failure is with a node that is further down the path segment between provider edge node 964a and provider edge node

964d than core node 964b. In the embodiment as shown, since there is substantially only one core node 964c that is further down the path segment than core node 964b, core node 964c may be assumed to have a forwarding problem.

Figure 11:
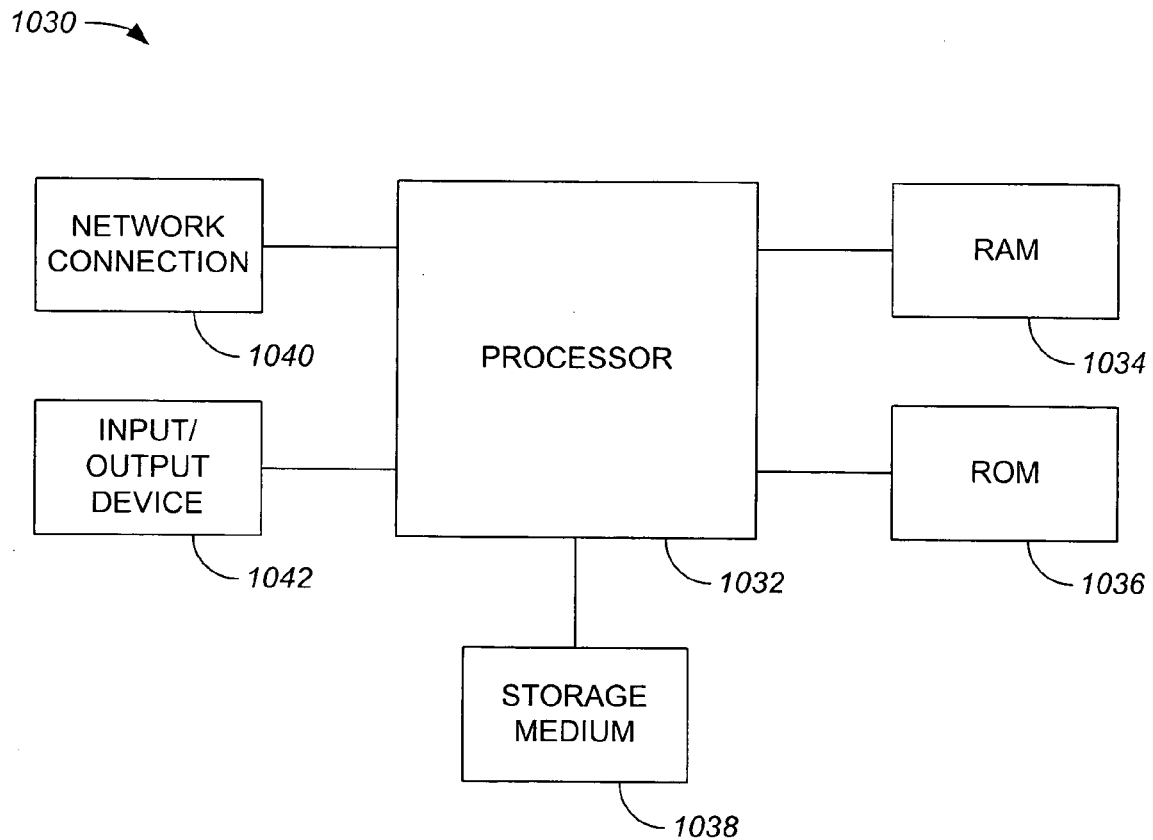
FIG. 11 illustrates a typical, general purpose computing device or computer system suitable for implementing the present invention.

FIG. 11 illustrates a typical, general purpose computing device or computer system suitable for implementing the present invention. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. An SFP module may generally be associated with network connection 1042 such that the SFP module receives and transmits data. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, while a counter has been described as being suitable for use in determining when a traceroute message has reached a destination provider edge node, substantially any suitable indicator may be used.

When a traceroute message is used to identify a source of a forwarding failure after another traceroute message is first used to determine the existence of at least one forwarding failure, the traceroute message may generally only identify a single forwarding failure. That is, when there is more than one forwarding failure along a path segment within a provider network, it may not be possible to identify more than one forwarding failure. As will be appreciated by those skilled in the art, with reference back to FIG. 10, if both core nodes 964b and 964c have forwarding failures, and both traceroute messages 956 and 970 would fail to reach their destinations. If traceroute message 970 is sent first and no reply message is received by provider edge node 964a, then an assumption may be made that at least core node 964b has a forwarding failure. However, given that core node 964b has a forwarding failure, then traceroute message 956 would not be received by core node 964c, so it may not be determined whether core node 964c also has a forwarding failure using substantially only traceroute messages.

In general, steps associated with the various methods of the present invention may be altered, reordered, added, and removed without departing from the spirit or the scope of the present invention. Therefore, the present examples are to be considered as illustrative and not restrictive, and the invention is not to be limited to the details given herein, but may be modified within the scope of the appended claims.

What is claimed is:

1. A method for detecting a forwarding problem within an autonomous system, the autonomous system having a plurality of nodes including a source node, an intermediate node, and a destination node, the method comprising:

initiating a message from the source node, the message being arranged to be sent to a message destination that is an external address that is not an address located within the autonomous system;

identifying a path, the path being arranged to pass from the source node to the external address via the intermediate node and the destination node;

determining a number of nodes through which the path segment passes between the source node and the destination node; and storing an indication in the message, the indication being arranged to indicate a number of nodes through which the path segment passes between the source node and the destination node;

forwarding the message from the source node along the path, wherein forwarding the message from the source node along the path includes receiving the message on a first node of the plurality of nodes, the first node being arranged to substantially alter the indication to indicate a number of nodes through which the path segment passes between the first node and the destination node;

receiving the message on the destination node, wherein a portion of the path between the source node and the destination node is a first path segment;

removing the message from the path at the destination node; and initiating a response from the destination node, the response being arranged to be sent along the first path segment from the destination node to the source node, wherein the response is arranged to indicate that the intermediate node does not have a forwarding problem.

2. The method of claim 1 wherein the external address is substantially specified in the message as the message destination.

3. The method of claim 1 wherein the source node is a first edge node of the autonomous system and the destination node is a second edge node of the autonomous system.

4. The method of claim 1 wherein when the message is received on the destination node, the destination node obtains the indication to determine whether to remove the message from the path.

5. The method of claim 1 wherein the path is a best path between the source node and the external address.

* * * * *